(12) United States Patent
Chiang et al.

(10) Patent No.: US 7,156,733 B2
(45) Date of Patent: Jan. 2, 2007

(54) USING SHARED FILES IN A GAME CONSOLE OR COMPUTER FOR CROSS-GAME STATE SHARING

(75) Inventors: Steve Chiang, Longwood, FL (US); Phil Frazier, Maitland, FL (US); Daniel Martin, Apopka, FL (US); Mathew Thazhmon, Maitland, FL (US); Mike Olsen, Redwood City, CA (US)

(73) Assignee: Electronics Arts Inc., Redwood City, CA (US)

( * ) Notice: Subject to any disclaimer, the term of this patent is extended or adjusted under 35 U.S.C. 154(b) by 0 days.

(21) Appl. No.: 10/437,259

(22) Filed: May 12, 2003

(65) Prior Publication Data

US 2004/0121837 A1 Jun. 24, 2004

Related U.S. Application Data

(60) Provisional application No. 60/435,490, filed on Dec. 20, 2002.

(51) Int. Cl.
*A63F 9/24* (2006.01)

(52) U.S. Cl. .............................. 463/1; 463/25; 705/14; 235/375

(58) Field of Classification Search ............ 463/43–45, 463/47, 25, 29, 23, 40–42; 711/100, 126, 711/147; 707/1, 9–10; 700/90–93; 705/14, 705/17–18; 235/375, 380, 382
See application file for complete search history.

(56) References Cited

U.S. PATENT DOCUMENTS

| | | | |
|---|---|---|---|
| 4,858,930 A | * | 8/1989 | Sato ............................ 463/23 |
| 5,779,549 A | * | 7/1998 | Walker et al. ................ 463/42 |
| 6,468,160 B1 | * | 10/2002 | Eliott .......................... 463/43 |

OTHER PUBLICATIONS

"Pokemon Statium® Gamespot review," pp. 1-3 printed from http://www.gamespot.com/n64/puzzle/pokemonstatium/review.html on Oct. 28, 2005.
"Amazon.com: Product Description:SimCopter," pp. 1-4 printed from http://www.amazon.com/exec/obidos/tg/stores/detail/-/videogames/B00002EPY8/reviews/002-9497795-3868037 on Oct. 28, 2005.
"SimCopter Review," by Al Giovetti, pp. 1-2 printed from http:www.thecomputershow.com/computershow/previews/simcopter.htm on Oct. 28, 2005.

\* cited by examiner

*Primary Examiner*—Mark Sager
(74) *Attorney, Agent, or Firm*—Townsend and Townsend and Crew LLP

(57) ABSTRACT

A method for enabling interaction with a shared game data file in a game device is provided. The method comprises: providing logic to perform one or more actions associated with the shared game data file; and providing logic to cause the game device to perform an action in the one or more actions with the shared game data file, the shared game data file allowing data associated with a first game in the shared game data file to affect actions in a second game.

39 Claims, 7 Drawing Sheets

USING SHARED FILES IN A GAME CONSOLE OR COMPUTER FOR CROSS-GAME STATE SHARING

CROSS-REFERENCES TO RELATED APPLICATIONS

This application claims priority from U.S. Provisional Application No. 60/435,490, entitled "Using Shared Files In A Game Console Or Computer For Cross-Game State Sharing", filed Dec. 20, 2002, which is incorporated herein by reference in its entirety.

BACKGROUND OF THE INVENTION

The present invention relates to video games in general and more particularly to sharing game state among disparate game titles.

It is common for video games to provide for saving a game state. For example, if a player desires to turn off a video game but return later and resume at the same place in the game, the player can "save" the game state. The game state that is saved is typically determined by the game's programmers, and might include a current playing time, a current level, a current position, attributes of the player's character(s), capabilities of the player, past performance of the player (e.g., the player has already solved a particular task) and acquisitions of the player (points, implements, values, etc.). There might be other game state that is not saved, such as the current values of registers and RAM locations used by the game, but generally game programmers will include in the game state those variables that are significant enough to create the perception with the player that the state of the game, at the time of saving or just before the time of saving, is preserved.

It should be understood that while it is referred to as "saving a game", the game program itself need not be saved, but the state of the game is saved. Typically, the game program is provided to the player in a nonvolatile, read-only form, such as a game cartridge, CDROM (Compact Disk— Read Only Memory), DVD (Digital Versatile Disk) or the like, and as such it does not need to be saved. As used herein, the term "game media" refers to the media on which game programs are provided, in whatever form. Typically, part or all of a game program is loaded from the game media into fast RAM and a processing unit, such as a CPU, works with the game program instructions, at least in part, from RAM rather than from the game media directly. However, in order to make efficient use of storage devices and to limit the use of the game to those players that possess the game media, typically only one game at a time can be run and only when the game media is coupled to the processing unit.

A common platform for playing video games is the game console. A game console is a computer that includes inputs and outputs suitable for game playing and includes a facility for inserting or attaching or connecting to some storage element containing a game program and the ability of the user to switch storage elements such that different games can be played at different times with a game console. The game console might include hardware to allow for multiple game consoles to intercommunicate.

Some popular game consoles include the Xbox™ console sold by Microsoft Corporation, the Sony Playstation™ 2 console sold by Sony, the Nintendo Game Cube™ (NCG) console sold by Nintendo Corporation, or the like. General purpose computers, cellular phones, and other game devices might also be used for playing video games, where the games support such platforms. Unless otherwise indicated, it should be understood that the term "game console" could extend to a personal computer or other general purpose computer or computing device when such computer or device is used to execute a game program.

Since the typical game is provided on nonvolatile, read-only media, game state cannot be saved onto such game media. To deal with game state, it is common for a console to provide some game-writable storage. With some consoles, this writable storage is in the form of a memory card that the player inserts to store game state, and possibly other data as well. With other consoles, fixed internal storage, such as a hard drive, is provided.

In a typical business arrangement, one company designs, manufactures and sells game consoles and games operable on those consoles are sold other companies. There might be many game developers that develop, distribute, and sell video games. To protect data for individual games in the face of many independent developers developing games, the console will typically assign or identify a unique code for each distinct game program and provide separate storage for that distinct game. For example, a racing game titled "Racing Game 2004" might be allocated a game ID of "R023", while a football strategy game titled "Football Franchising 2004" might be allocated a game ID of "F011". When a game program is to store game state, it might make a call to a game console routine for storage, providing its game ID and the game state data to be stored. When the game program subsequently wishes to restore a game state, it might make a call to a game console routine for reading game state data, providing its game ID.

To ensure that one developer's game does not adversely effect another developer's game, or even among games of a common developer, a game console manufacturer typically tests or certifies game programs before they can operate on the game console and provides a game ID for each product so tested and/or certified. Each product will typically have a distinct game ID, as provided by the console manufacturer or generated in some way to be unique from the game ID's of other products. As used herein, "title" refers to a particular game by a particular developer and "product" refers to a particular game. For example, "Madden NFL 2003"™ is a title offered by Electronic Arts of Redwood City, Calif. and that title might be embodied in several products, such as the "Madden NFL 2003"™ game for the Xbox™, the "Madden NFL 2003"™ game for the Playstation 2™, etc. Different versions of a game title are typically considered distinct titles. For example, the "Madden NFL 2003"™ title and the "Madden NFL 2004"™ title might be distinct titles.

Some game consoles do not restrict what data a game program can access, so in some cases, a game program might read data from game console storage that was stored by another game. However, many game consoles prevent this or only allow reading of selected datasets not created by the game program doing the reading.

While the compartmentalization of game state allows various developers to develop game programs that are reliable, such compartmentalization prevents games from using state that might span multiple games.

BRIEF SUMMARY OF THE INVENTION

Embodiments of the present invention generally relate to using a shared game data file in a gaming device.

In one embodiment, a method for enabling interaction with a shared game data file in a game device is provided. The method comprises: providing logic to perform one or more actions associated with the shared game data file; and providing logic to cause the game device to perform an action in the one or more actions with the shared game data file, the shared game data file allowing data associated with a first game in the shared game data file to affect actions in a second game.

In another embodiment, a game application associated with a game that interacts with a game device, the game device including a shared game data file is provided. The game application comprises: game logic including one or more functions, the one or more functions usable to perform actions using the shared game data file; and an interface to the game device, the interface receiving requests for a function in the one or more functions and providing the function to the game device so the game device may use the function to perform an action associated with the function using the shared game data file, wherein the shared game data file includes data for a first game that is used to affect actions in a second game.

In yet another embodiment, a shared game data file included in a game device is provided. The shared game data file comprises: first data associated with a first game and written to the shared game data file using game logic associated with the first game; and second data associated with a second game and written to the shared game data file using game logic associated with the second game, wherein the first data associated with the first game is used by the second game to affect actions in the second game and the second data associated with the second game is used by the first game to affect actions in the second game.

A further understanding of the major advantages of the invention herein may be realized by reference to the remaining portions of the specification and the attached drawings.

DETAILED DESCRIPTION OF THE INVENTION

Figure 1:
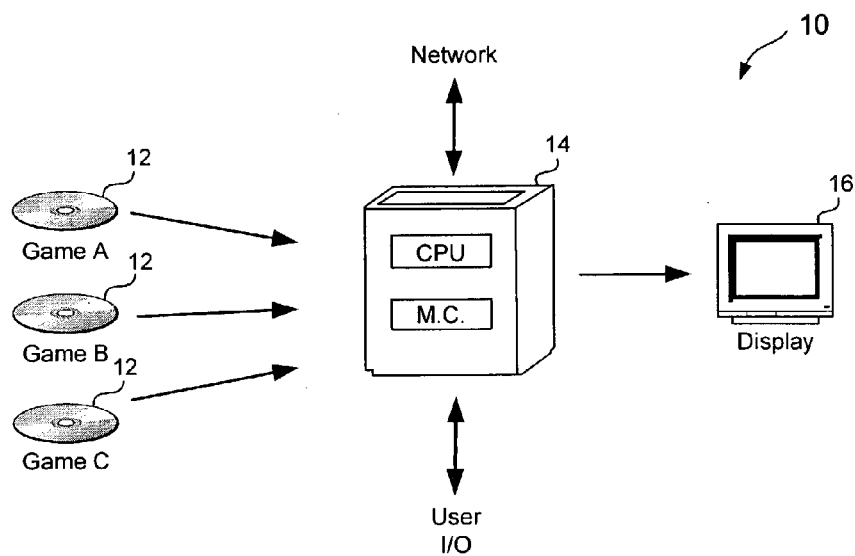
FIG. 1 illustrates a game system for providing one or more games for a user according to one embodiment of the present invention.

FIG. 1 illustrates a game system 10 for providing one or more games for a user according to one embodiment of the present invention. System 10 includes one or more game media 12 (game A, game B, game C), a game device 14, and a display 16.

One or more game media 12 include any game applications that may be used by game device 14 to provide a game for a user. Each game medium 12 includes logic to provide a game, denoted as game A, game B, game C. In one embodiment, the game provided by game device 14 is an electronic video game. Games are each individually stored on media, such as CDROMs, digital versatile disks (DVDs), game cartridges, or any storage media. A game, such as game A, is inserted in, coupled to, or in communication with game device 14 so that game device 14 may read a game application found on game media 12.

Game device 14 is a computing device that includes a CPU and data storage. Game device 14 may be connected to a network that allows game device 14 to provide games that are not included on one or more game media 12. Thus, game A, game B, and game C may be accessed through the network and not be individually stored on game media 12. The games provided by game applications on game media 12 are displayed on display 16. A game application may be also referred to as a game code and/or a game program. A game application will be understood to include software code that game device 14 uses to provide a game for a user to play. A user interacts with the game application and game device 14 through user input/output (I/O) devices.

Figure 2:
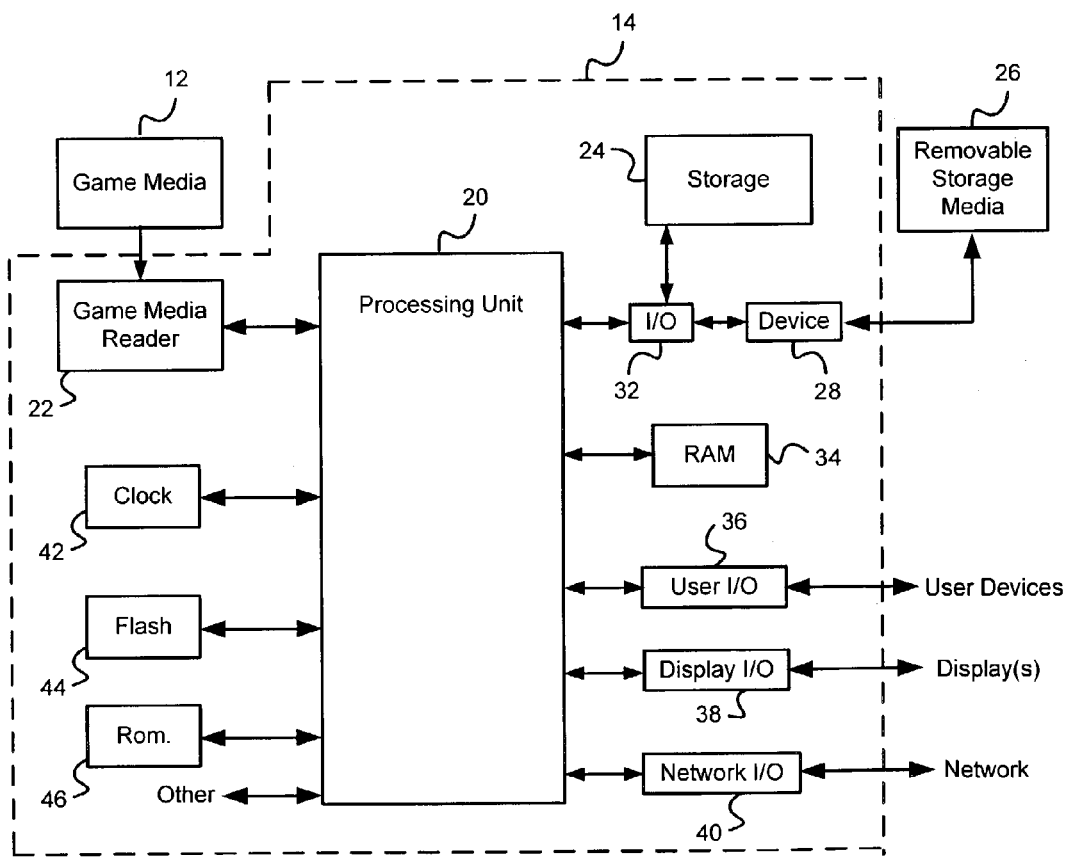
FIG. 2 illustrates an embodiment of a game device according to the present invention.

FIG. 2 illustrates an embodiment of game device 14 according to the present invention. It should be understood that other variations of game device 14 may be appreciated by a person of skill in the art. As shown, game device 14 includes a processing unit 20 that interacts with other components of game device 14 and also external components to game device 14. A game media reader 22 is included that communicates with game media 12. Game media reader 22 may be a CDROM or DVD unit that reads a CDROM, DVD, or any other reader that can receive and read data from game media 12.

Game device 14 also includes various components for enabling input/output, such as an I/O 32, a user I/O 36, a display I/O 38, and a network I/O 40. I/O 32 interacts with a storage 24 and, through a device 28, removable storage media 26 in order to provide storage for game device 14. Processing unit 20 communicates through I/O 32 to store data, such as game state data and any shared data files. In addition to storage 24 and removable storage media 26, game device 14 includes random access memory (RAM) 34. RAM 34 may be used for data that is accessed frequently, such as when a game is being played.

User I/O 36 is used to send and receive commands between processing unit 20 and user devices, such as game controllers. Display I/O 38 provides input/output functions that are used to display images from the game being played. Network I/O 40 is used for input/output functions for a network. Network I/O 40 may be used if a game is being played on-line or being accessed on-line.

Game device 14 also includes other features that may be used with a game, such as a clock 42, flash memory 44, read-only (ROM) 46, and other components. It will be understood that other components may be provided in game device 14 and that a person skilled in the art will appreciate other variations of game device 14.

As game device 14 reads game media 12 and provides a game, information may be read from game media 12 and stored in a memory device, such as RAM 34. Additionally, data from storage 24, ROM 46, servers through a network (not shown), or removable storage media 26 may be read and loaded into RAM 34. Although data is described as being found in RAM 34, it will be understood that data does not have to be stored in RAM 34 and may be stored in other memory accessible to processing unit 20 or distributed among several media, such as game media 12 and storage 24.

Figure 3:
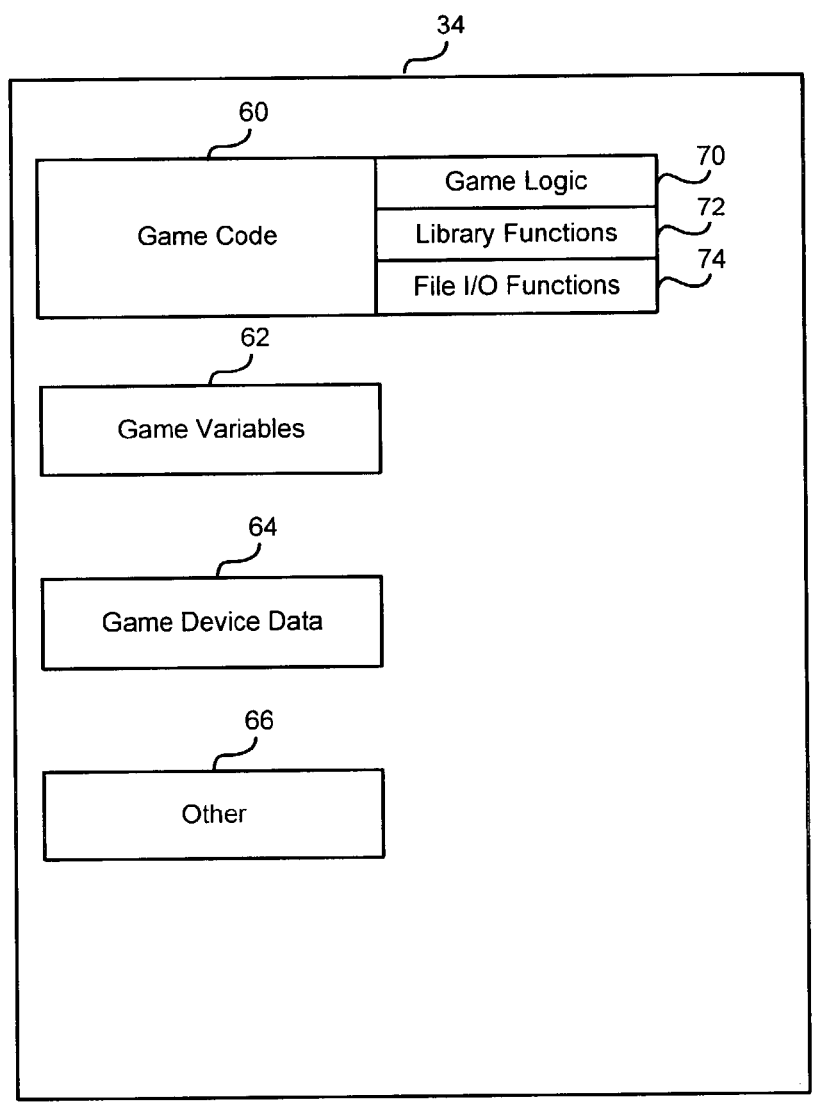
FIG. 3 illustrates an example of data that may be stored in RAM to provide a game according to one embodiment of the present invention.

FIG. 3 illustrates an example of data that may be stored in RAM 34 to provide a game according to one embodiment of the present invention. For example, a game code 60, game variables 62, game device data 64, and other data 66 may be downloaded from game media 12 and stored in RAM 34. It will be understood that a person of skill in the art will appreciate other data that may be stored in RAM 34 that will enable game device 14 to provide the game.

Game code 60 may be any logic that is found on game media 12 that is used to provide a game. Game code 60 includes game logic 70, library functions 72, and file I/O functions 74. Game logic 70 is used to provide any functions of the game. Library functions 72 include any functions that are used to provide a game. File I/O functions 74 are used by processing unit 20 to perform input/output functions.

Game variables 62 are variables that are specific to a game and are used by processing unit 20 to provide variations of games for different users. The variables allow game device 14 to provide variations to the game based on actions by a user playing the game.

Game device data 64 is data specific to a game console that game code 60 is designed for. For example, different versions of game code 60 may be designed for different platforms supported by different game devices 14. Data specifically needed to operate game code 60 on a specific platform for a specific game device 14 may be included in game device data 64. Other data 66 may be any other data that is used with the game.

As a game found on game media 12 is played on game device 14, data regarding the state of the game and any other related aspect of the game may be generated. The game state data is then stored in storage, such as storage 24, removable storage media 26, RAM 34, or any other storage media accessible to game device 14. The game state data may then be used at another time by game device 14 to provide a game that is in the same state as when a user last played the game and saved its state. For example, the game state data may include data that allows a user to continue at a same level that the user has completed, data related to certain achievements that the user has accomplished, etc. It should be noted that the game state data does not necessarily start the game at the same exact place as the place when the game was last stopped but rather may start the game at a certain level or time related to when the game was last stopped or its state was saved.

In addition to the game state data that is stored, shared game state data may also be stored. The shared game state data is stored in a shared game state file that may be read from and written to by game code 60 for multiple games. Data found in the shared game state file may be used by game code 60 for a first game to provide a game that uses shared data from a second game, where the shared data from the second game affects actions in the first game.

Figure 4:
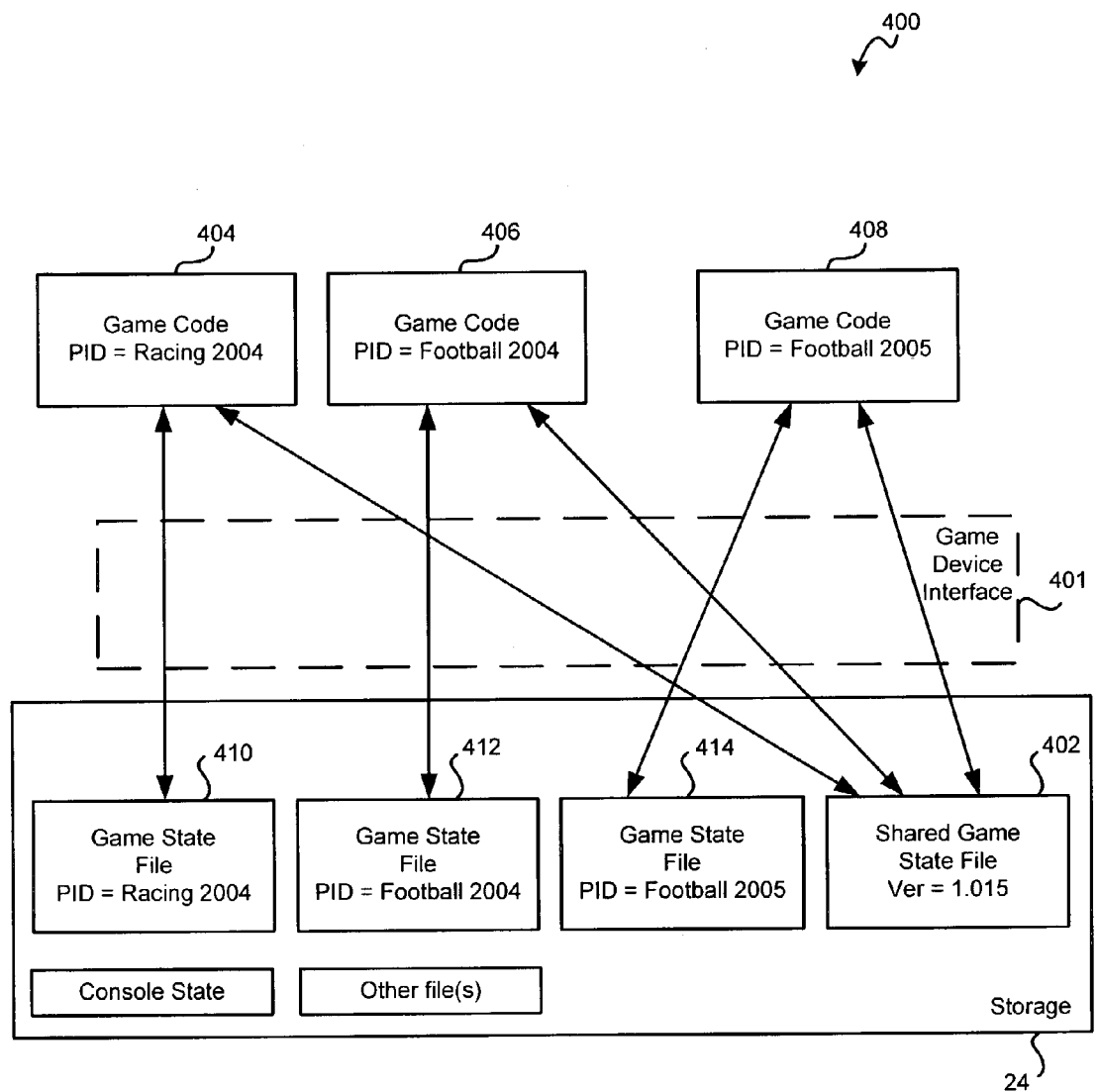
FIG. 4 illustrates a simplified block diagram that shows the interaction of game code with a shared game state file according to one embodiment of the present invention.

FIG. 4 illustrates a simplified block diagram 400 that shows the interaction of game code with a shared game state file 402 according to one embodiment of the present invention. As shown, FIG. 4 includes a first game code 404, a second game code 406, and a third game code 408. Game code 404, 406, and 408 each correspond to a different game. For example, game code 404 may correspond to a Racing 2004 game, game code 406 may correspond to a Football 2004 game, and a game code 408 may correspond to the same Football game but a 2005 version of the game. Game code 404, 406, and 408 are each found on different game media 12. Additionally, portions of game code may be read into RAM 34. Each game code 404, 406, and 408 includes a product I.D. (PID) that may be used to uniquely identify the game. For example, the PID for game code 404 is "Racing 2004", the PID for game code 406 is "Football 2004", and the PID for game code 408 is "Football 2005". It should be understood that these PIDs are being used for illustrative purposes and the PIDs may be represented by other representations, such as numbers, characters, 32-bit integers, etc.

When appropriate, game device 14 and game code 404, 406, and 408 interact to provide data that should be stored in storage 24. For example, game code 404, 406, or 408 is read by game device 14 through game device interface 401. In one embodiment, each game code 404, 406, and 408 has a unique file that includes game state data specific to each game code in storage 24. Although game state data is stored in storage 24, it will be understood that game state data may be stored in any medium, such as RAM 34, removable storage media 26, a server through a network, and the like. As shown, game code 404 is associated with a game state file 410, game code 406 is associated with a game state file 412, and game code 408 is associated with a game state file 414. Each game state file 410, 412, and 414 is uniquely identified by its corresponding game code PID.

In one embodiment, each game code 404, 406, or 408 may access files in storage 24 at different times. For example, the Racing 2004 game may be played by a user where data is accessed and/or stored in game state file 410 and/or shared game state file 402. Then, the user may play the Football 2004 game where data is accessed and/or stored for game state file 412 and/or shared game state file 402. While playing the Football 2004 game, data for the Racing 2004 game may be read and used by the Football 2004 game.

In addition to storing individual game state data, game device 14 stores shared game state data in shared game state file 402. The data stored in shared game state file 402 may include data from, if applicable, game code 404, game code 406, and/or game code 408. Thus, shared game state file 402 is configured to store data associated with different games. For example, data from the Racing 2004, Football 2004, and Football 2005 game applications may be stored in shared game state file 402. The multiple game codes can thus read and write data associated with the game to shared game state file 204. A version number may also be included in shared game state file 402 to insure compatibility between different versions of games for game state data.

As a game is played (e.g., the game associated with game code 404), game device 14 reads game code 404 to provide the game to a user through display 16. As a user plays the game, certain achievements may be reached in the game. Game device 14 then communicates with game code 404 for the game to determine the appropriate data that should be stored in the game state file 410 and shared game state file 402. For example, if a user reaches a certain level in the Racing 2004 game, game code 404 may store achievement data corresponding to the achievement in shared game state file 402. Another game code, such as game code 406, may then read the achievement data for game code 404 that was stored in shared game state file 402 and that achievement data may be used by game code 406 to affect actions in the Football 2004 game corresponding to game code 406. For example, certain unlockables or passwords may be provided to a user if a certain achievement has been achieved in another game. Also, certain levels or special features may be attained depending on data stored by another game code in shared game state file 402. As the Football 2004 game is played, data corresponding to the game play may also be stored in shared game state file 402. In some embodiments, shared game state is also stored in a game state file that also maintains game state for one of the games. Although in this case, the shared game state will be accessible by other games or another shared game state file may exist.

Figure 5:
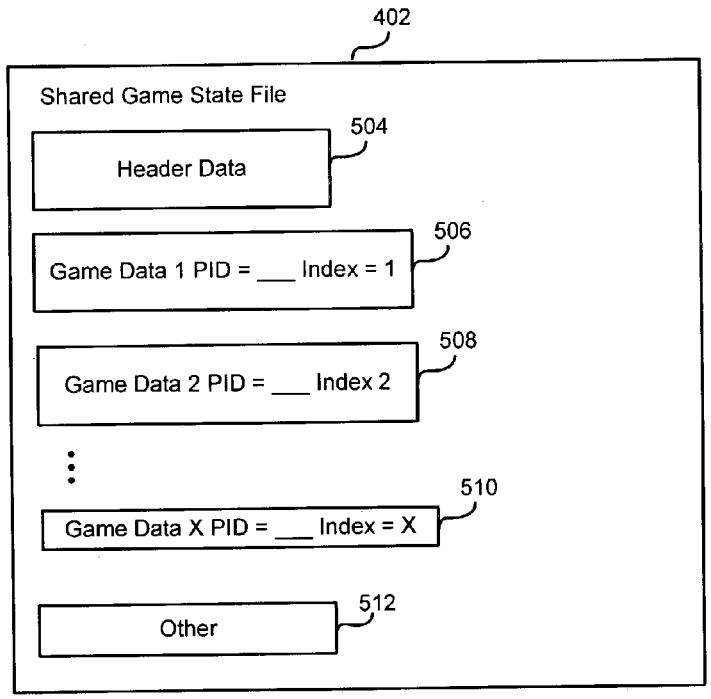
FIG. 5 illustrates an embodiment of the shared game state file according to one embodiment of the present invention.

FIG. 5 illustrates an embodiment of shared game state file 402 according to one embodiment of the present invention. As shown, shared game state file 402 includes header data 504, game data 506, game data 508, . . . , game data 510, and other data 512.

Header data 504 is used to identify the shared game state file 402. Header data 504 may also include the version number of shared game state file 402.

Game data 506, 508, and 510 illustrate different game data that have been stored for different games. For example, game data 506 may be game data for the Racing 2004 game, game data 508 may be game data for the Football 2004 game and game data 510 may be game data for the Football 2005 game. In one embodiment, each game data is identified by its PID. Additionally, each game data 506, 508, and 510 may be stored in an index and retrieved using the index. In one embodiment, game data, such as game data 506, is used to affect actions in another game, such as a game associated with game data 508, and vice versa. Additionally, game data 506, 508, and 510 may be read by any game code and any game code may write data either to game data 506, 508, 510, or to a new game data entry.

Figure 6:
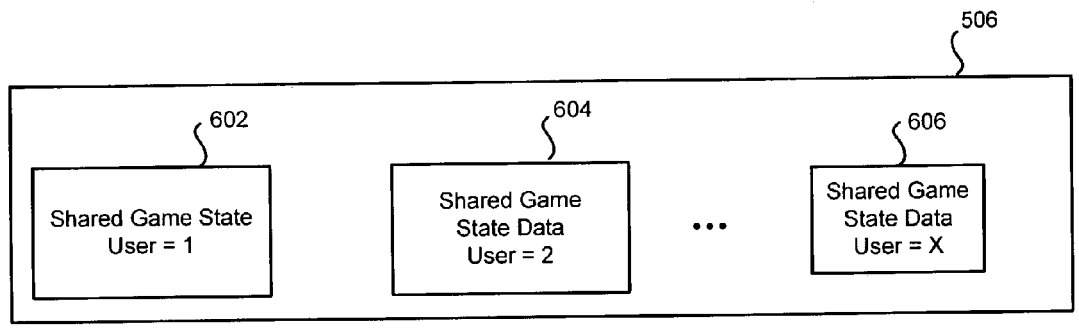
FIG. 6 illustrates an embodiment of game data in the shared game state file, according to the present invention.

FIG. 6 illustrates an embodiment of game data in shared game state file 402, such as game data 506, according to the present invention. As described above, shared game state file 402 may include game data for multiple games. Additionally, each individual game data may include game data for different users. As shown, game data 506 includes a shared game state data 602 for a user 1, a shared game state data 604 for user 2, a shared game state data 606 for a user X, etc. Thus, game data in shared game state file 402 may be classified by different users, such as user 1, user 2, . . . , user X. In one embodiment, shared game state data for user 1 may be used to affect actions for a game played by another player, such as user 2, and vice versa. In this case, user 1 and user 2 may be partners in a game. However, in most cases, shared game state data for a specific user will be used to affect actions in another game for only that specific user.

Figure 7:
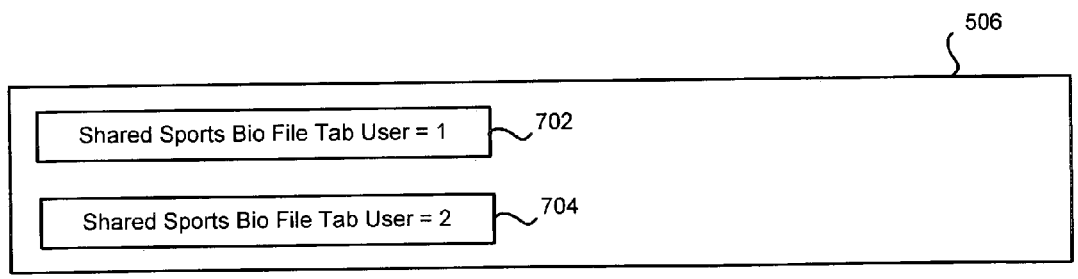
FIG. 7 illustrates an embodiment of game data according to the present invention.

FIG. 7 illustrates another embodiment of game data, such as game data 506 according to the present invention. As shown, data for a shared sports bio is stored in game data 506. In one embodiment, as shown, a shared sports bio file may be stored for each user. Game data 506 includes a shared sports bio file 702 for a user 1 and a shared sports bio file 704 for a user 2. Shared sports bio files 702 and 704 illustrate shared files that include data for certain games classified as being sports games. Also, other bios, such as bios for adventure games, fighting games, etc., may be stored. In one example, if a certain level, such as all "Super Bowl" level is reached in a football game, certain data corresponding to the user and game is stored in shared sports bio file 702 or 704. Then, when another sports game is played by the user, the data corresponding to the achievement in sports bio file 702 or 704 may be read and used for to affect actions in the second sports game. Additionally, the second sports game may write data corresponding to the second sports game in game data 506.

Figure 8:
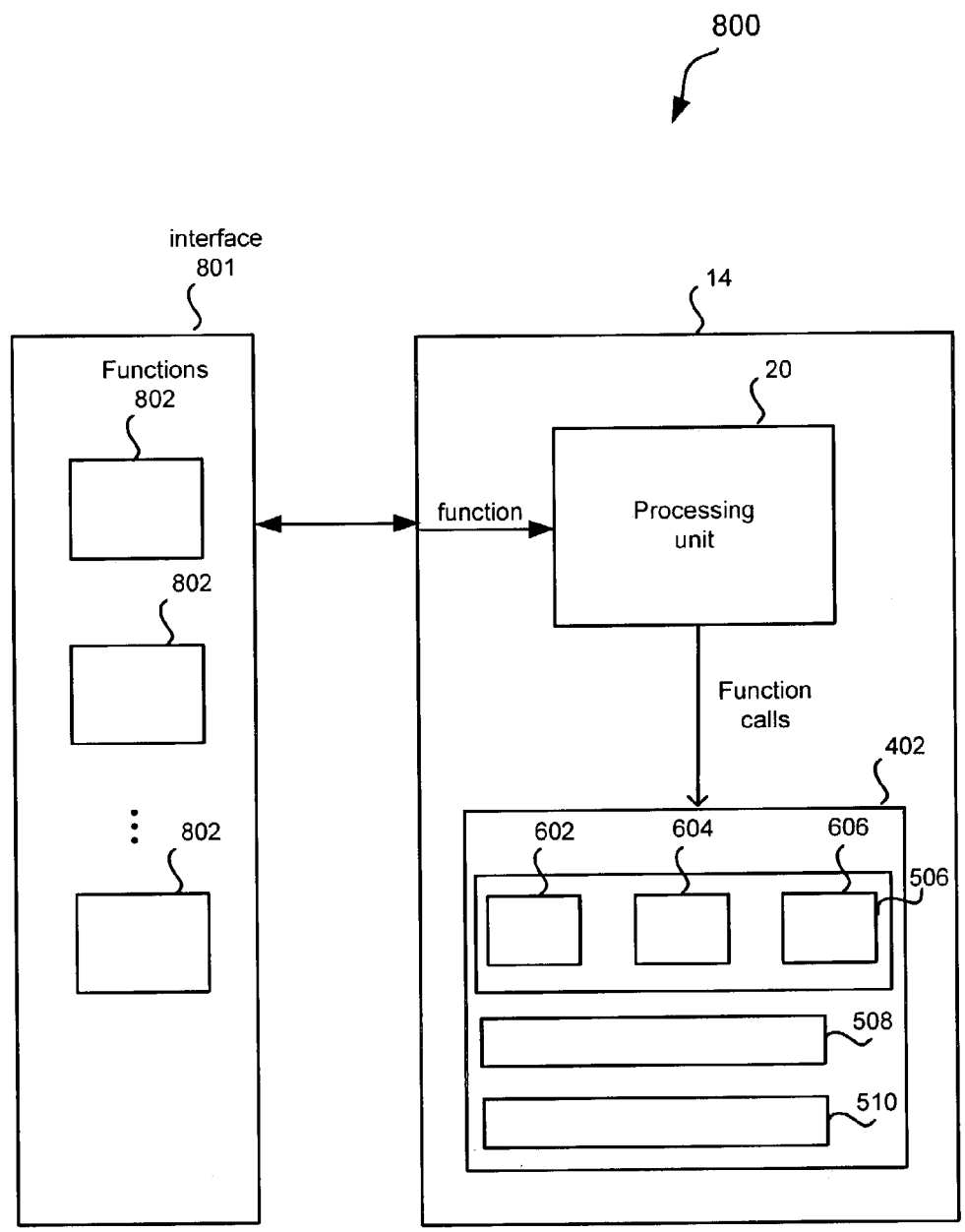
FIG. 8 illustrates a system that shows the interactions between an interface for a game code and the game device according to one embodiment of the present invention.

FIG. 8 illustrates a system 800 that shows the interactions between an interface 801 for a game code and game device 14 according to one embodiment of the present invention. Interface 801 includes one or more functions 802. One or more functions 802 are functions that include actions that are used by processing unit 20 to perform the action on shared game state file 402. Interface 801 includes logic, such as game code, that is stored in media 12 and possibly downloaded to RAM 34.

When a call is made to interface 801 from processing unit 20, a corresponding function 802 that is associated with the call is made available to processing unit 20, which performs an action in one or more functions 802. Function 802 may include logic that is used by processing unit 20 to determine which game data, such as game data 506, 508, or 510, and which shared game state file, such as shared game state file 602, 604, or 606, to access and an action that should be performed. For example, if a user 1 is using a game provided by interface 801, a shared game state file 602 may correspond to user 1. As user 1 plays a game, an action in one or more functions 802 may be triggered. In this case, processing unit 20 reads function 802 and uses logic found in function 802 to perform an action with shared game state file 602. The action effected by processing unit 20 using shared game state file 602 may use data from a first game to affect actions in a second game that the user is playing. Also, the action may be to write data to shared game state file 402 when data written by multiple games is present in file 402.

Figure 9:
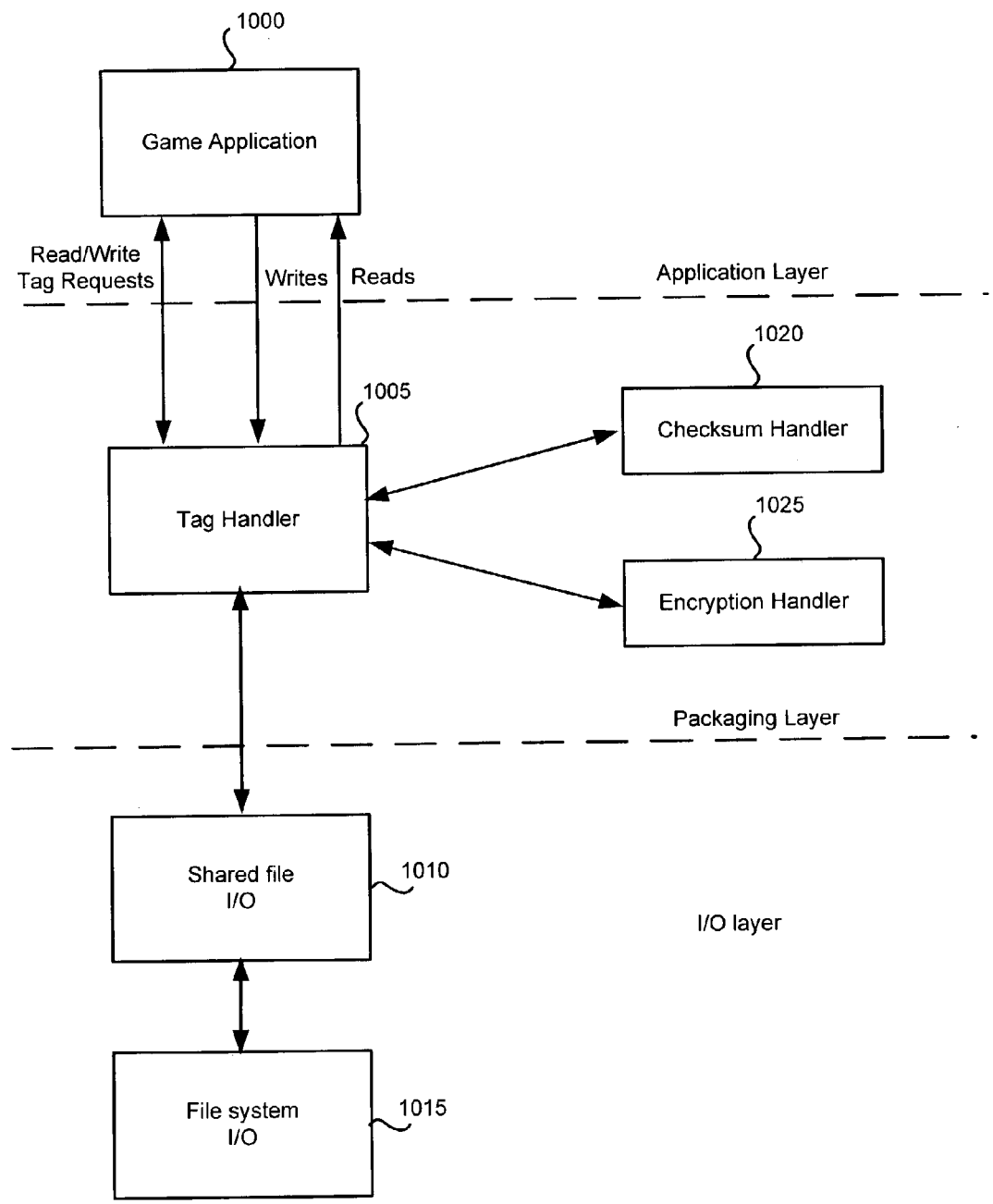
FIG. 9 illustrates a software infrastructure that might be used in support of shared files according to one embodiment.

FIG. 9 illustrates a software infrastructure, such as an infrastructure found in game code 60, that might be used in support of shared files according to one embodiment. As shown there, software components such as a game application 1000, a tag handler 1005, a shared file I/O handler 1010, a file system I/O handler 1015, a checksum handler 1020 and an encryption handler 1025 interact.

In particular, for an access to a shared file, game application 1000, which may be part of interface 801, might determine that a write to the shared file is needed. The write is packaged as a "tag" element (described below) that is passed to tag handler 1005, which might invoke checksum handler 1020 and/or encryption handler 1025 if those components are used, to provide checksum services and/or encryption, respectively. Thus, checksum handler 1020 might calculate and add a checksum to the write request and encryption handler 1025 might encrypt the write request data. Tag handler 1005 then passes the write request to shared file I/O handler, which deals with the organization of the shared file and in turn passes the write request to file system I/O handler 1015.

In one implementation, a game designer designs game application 1000 and file system I/O handler 1015 and a shared file infrastructure designer designs tag handler 1005, shared file I/O handler 1010, checksum handler 1020 and encryption handler 1025 so that the game designers do not need to be concerned with those elements and the shared file infrastructure designer does not need to be concerned with particular game operations or basic file I/O that might be specific to game device 14 on which the game was designed for. As an example of how this might be implemented, when file system I/O handler 1015 wants to perform a function, a callback is supplied from game application 1000. Callbacks provide access to a function. Thus, because callbacks from game applications are used, different game applications may supply different callbacks for the same function request from SFIO 1015. The file system I/O handler would handle the memory allocation and other low level tasks.

An example of a checksum handler is a program that provides 32-bit checksums of the data to be written (and verifies 32-bit checksums of data read from a file). An example of a tag hander is a component that reads and writes data in a tag based format, wherein each "chunk" of data includes a tag. Where data is stored as (tag, data) tuples, later programs can read the shared file correctly and just ignores those tags not understood by the reader.

On some game devices 14, shared file I/O might require that a title have more than one game ID, such as a game ID (for accessing single game data) and a shared file ID (for accessing shared game data).

In some implementations, most of the functions are asynchronous functions, such that they return to the code that called the function once they start. A periodically run process can check to determine if the function is complete. Where the SFIO is asynchronous in nature it might be implemented as follows with one operation at a time, and functions being called to start an action ( e.g., SFIO<ACTION>Start( ) (where<ACTION>is create, find, write, etc.). To the caller, each ACTION represents one atomic operation at the shared module level, however each ACTION may in reality be composed of multiple sub-atomic operations at the callback level. A status process, SFIOProcess( ), might be called every frame to determine the actual status of the previous requested action. This function might have its own internal state machine to track the progress of the requested operation, returning a response indicating whether the process is complete, incomplete or that no process is active.

Tag Handler

Tag handler 1005 provides a platform and product agnostic interface that formats and unformats data between the application layer and the IO layer. This layer packages data based on tags, wherein chunks of data can be stored in a file and a reader that does not understand some tags will just leave the data of those tags alone, without trying to process it. An example of a file format on which this might be based is Electronic Arts' IFF file format. For example, each chunk of data might be stored as 1) a tag name, 2) a size indicator, 3) a checksum, and 4) the data stored. Each file might have a unique file ID that is checked on every read and modified on every write to track files between each access. Further details of the file format are shown below.

File Format

One example of a format for a shared game state file such as a bio file is shown below. In this format, the file is a fixed size and contains a fixed format. Unused portions of any struct element are filled with initializer values to distinguish empty entries from valid ones. The use of tags, however, provides for a file format that is extensible and backwards compatible. As long as the meaning and the data connected with each tag does not change from year to year and product to product, additional data can be added to the file to accommodate future products while still supporting past products. The tags can be transparent to the game logic, through the use of a tag handler, as described above. Game logic should only ever request data for tags that it understands. The shared game state file might be organized as shown in Table 1 (the overhead of the tags themselves, the size and the checksums is not shown).

TABLE 1

File Format

| Field | Value | Bytes | Comment |
| --- | --- | --- | --- |
| Chunk | KIND | 4 | The kind of file (e.g., EASB) |
| Chunk | VER | 4 | Version chunk. |
| Chunk | HeaderT | 42 | Header data chunk. |
| ChunkID | ProductT | 2315 | Product data chunk for product 1. |
| ... | ... | ... | ... |
| ChunkID | ProductT | 2315 | Product data chunk for product 50. |
| ChunkID | ImageT | 17206 | Image data chunk for product 1. |
| ... | ... | ... | ... |
| ChunkID | ImageT | 17206 | Image data chunk for product 25. |

Table 2 lists some constants that might be used in constructing and using a shared game state file. It should be understood that other suitable values for these constants might be used without departing from this disclosure. As used in Table 2 and following tables, the "type" column refers to the type of the constant or the field, with Uint8, Uint16, Uint32 referring to 8-, 16- and 32-bit unsigned integers respectively, Time referring to a time value (such as a 32-bit number representing the number of seconds elapsed since some time in the past) and Color referring to a color value (such as a 24-bit color value without any alpha as an RGB value with eight bits per color).

TABLE 2

Constants

| Name | Type | Value | Comments |
| --- | --- | --- | --- |
| NUM_PROD | Uint8 | 50 | Maximum number of products in a shared game state file. |
| NUM_IMAGES | Uint8 | NUM_PROD | Maximum number of images (might be zero, or less than NUM_PROD). |
| NUM_ACCOMPLISHMENTS | Uint8 | 32 | Maximum number of accomplishments. |
| LENGTH_IMAGE_SIDE | Uint8 | 128 | Length of the side of an image in pixels. |
| NUM_COLOR_INDEX | Uint8 | 256 | Number of distinct colors that can appear in an image. This is used to index into the color table. |

TABLE 2-continued

Constants

| Name | Type | Value | Comments |
|---|---|---|---|
| TEXT_COPYRIGHT_LENGTH | Uint8 | 31 | Maximum length of the copyright text. |
| TEXT_PRODUCT_TITLE_-LENGTH | Uint8 | 35 | Maximum length of the product title text. |
| TEXT_PRODUCT_GAMES_-PLAYED_TYPE_LENGTH | Uint8 | 19 | Maximum length of the "type of game" games played text. |
| TEXT_ACCOMPLISHMENT_-LENGTH | Uint8 | 63 | Maximum length of the accomplishment text. |
| MAX_GAMES | Uint8 | 250 | Maximum number of games tracked. |

Tables 3, 4 and 5 show examples of what might be a format for the HeaderT, ProductT and ImageT chunks, respectively.

TABLE 3

HeaderT Format

| Name | Type | Comments |
|---|---|---|
| strCopyright[TEXT_COPYRIGHT_LENGTH + 1] | Char | Copyright string. |
| uSecondsGamePlay | Uint32 | Total game play time. |
| uSecondsNonGamePlay | Uint32 | Total non game play time. |

TABLE 3-continued

HeaderT Format

| Name | Type | Comments |
|---|---|---|
| uNumProducts | Uint8 | The number of products in this bio file, from 1 to NUM_PROD. |
| uNumProductsPlayed | Uint8 | Number of titles ever played with this file from 1 to MAX_GAMES. |

TABLE 4

ProductT Format

| Name | Type | Comments |
|---|---|---|
| strProductTitle[TEXT_PRODUCT_TITLE_LENGTH + 1] | Char | Product Title (alphanumeric). |
| strProductGamesPlayedType[TEXT_PRODUCT_GAMES_PLAYED_TYPE_LENGTH + 1] | Char | The type of game played. This string contains the word(s) that describe the unit of "game" for this product (e.g., match, game, race, contest etc.). (alphanumeric) |
| DateLastPlayed | Time | Date and time product was last used. |
| uSecondsGamePlay | Uint32 | Total game play time. |
| uSecondsNonGamePlay | Uint32 | Total non game play time. |
| uGamesPlayed | Uint32 | Number of games played. |
| uGameWon | Uint32 | Number of games won. |
| NextRewardAt | Uint16 | If rewards are present for this product, this indicates what level the next reward is available at, from 1 to some upper limit, such as 1250 (five times MAX_GAMES). |
| Accomplishment[NUM_ACCOMPLISHMENTS][TEXT_ACCOMPLISHMENT_LENGTH] | Accomp | List of accomplishments, of a type described below. |

TABLE 5

ImageT Format

| Name | Type | Comments |
| --- | --- | --- |
| ImageHeader | Header | Contains the standard header structures for a DIB file (corresponds to the standard BITMAPFILEHEADER and the BITMAPINFOHEADER in the Windows DIB format). |
| ImageTable(sizeof(Color)* NUM_COLOR_INDEX) | Uint8 | The color table for the image. |
| uImage[LENGTH_ IMAGE_SIDE^2] | Uint8 | This contains the data for an image. |

The accomplishments type "Accomp" might be further divided as indicated in Table 6.

TABLE 6

Accomp Format

| Name | Type | Comments |
| --- | --- | --- |
| strAccomplishmentTitle[TEXT_ ACCOMPLISHMENT_ LENGTH + 1] | Char | What the accomplishment is. (alphanumeric) |
| DateAwarded | Time | Date accomplishment occurred. |
| uAccomplishmentValue | Uint8 | Value of accomplishment. A value of 0 indicates an invalid accomplishment. An example range might be from 0 to 250. |

The individual product accomplishment array can have up to NUM_ACCOMPLISHMENTS (32, for example) accomplishments per product saved off as text strings (potentially two separate arrays for major and recent accomplishments). For the two arrays, the top five or so accomplishments in terms of value are kept and, while preserving the top five, the oldest accomplishment is overwritten with the new one. That way both the "Major Accomplishments" and the "Recent Accomplishments" can be displayed. Example:

Name="Madden NFL 2004"
AccompBio=0–31
AccompText="Aug. 16, 2003—Won the Super Bowl in Franchise Mode"
AccompValue=20
AccompDate=Aug. 16, 2003 11:43:02 pm The Individual Product Reward Array can have up to NUM_REWARDS (32, for example) unlockable rewards per product. This data can be product specific and need not be supported by each product. Each game can set up its own rewards and criteria. Example:

Name="Madden NFL 2004"
RewardBio=0–31
RewardLevel=2
RewardUnlocked=FALSE

The RewardUnlocked field indicates whether the user has rewards waiting in another game.

Some products may have severe memory constraints and may not want to store the full text of an accomplishment in memory. They may prefer to use their own proprietary mechanism to store this text. An example mechanism for dealing with this is: each product specifies how many bytes to allocate for the accomplishment string. If this is less than the default, the text is considered "packed". Products that choose to use packed accomplishment text will also provide an unpack callback. This unpack callback will convert the packed text into the unpacked text. This unpack callback will be called while merging the data in memory and the data on the card (when more memory is available). This merge will take place automatically if needed when a "load product data" function is called by the product. When an accomplishment occurs, the product will call a "set accomplishment" function with the packed data as one of the parameters.

Shared game state files allow for features such as a "game player bio" that represents a player's accomplishments and other details over multiple games. Thus, when a player reaches a level of accomplishment in one game, it can affect the player's interaction with another game, such as by providing access to additional features, levels or the like.

In each game that supports a shared game state, it might provide a menu item where the player can look at the contents of his or her bio file. This might include individual product accomplishments as well as an overall level, view basic product statistics, global EA Sports statistics, and reward information for each product listed. At any given level, each individual product can choose to unlock its own special rewards. As the user gains experience and plays more titles, he or she is rewarded with unlockables in each of the games found in the bio file.

The first time a user completes an accomplishment and has a valid storage device, the game might ask to create a bio file. In game device 14 where saved files are specific to, and can be accessed only by, the game ID that created the saved file, a game might include a "shared" game ID for use in accessing (reading/writing/modifying) the shared game data file. As the first title writes data, the shared access file is stamped with this shared game ID.

Where the number of distinct games for which a bio can track is limited, older games (in terms of when the user last played them) can be removed, but overall levels or experience values might remain.

Examples of statistics saved for games include time logged, last date played, and recent accomplishments (such as game-dependent text strings that get saved when accomplishments are made). To allow for a current game to display icons for each of the prior games referenced in the bio file, each game that adds a new entry in the shared file will also include an image file representing that game. That way, each game need not include icons for all other possible games that could be in the bio.

Figure 10:
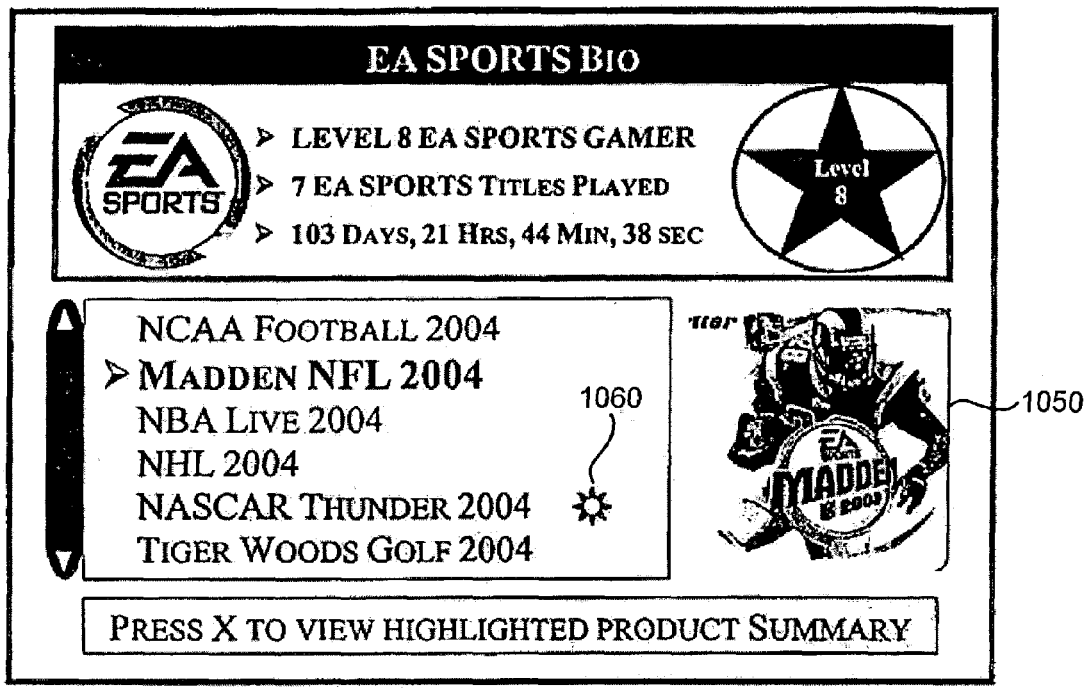
FIGS. 10–11 depict examples of screens presented to the user relating to shared game state.
Figure 11:
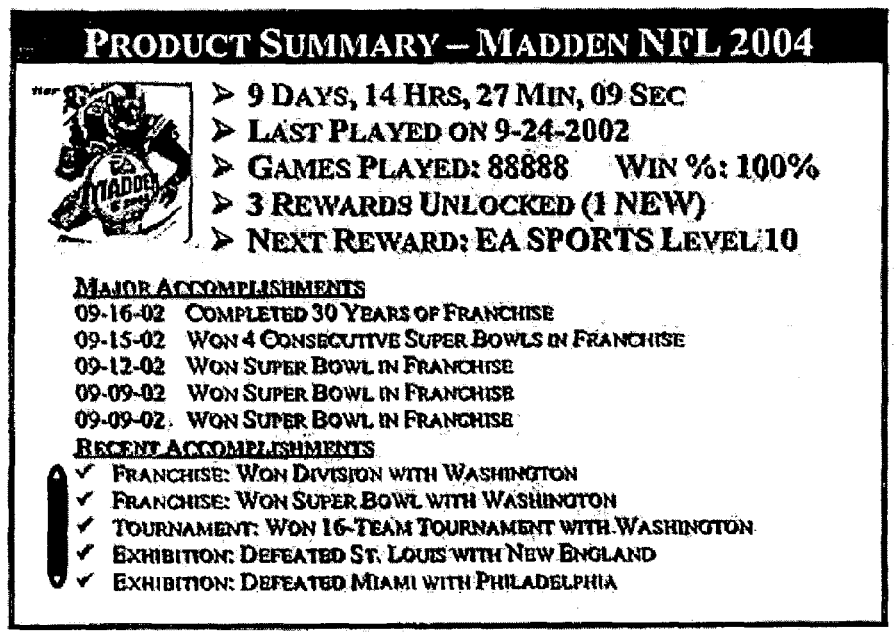

Examples of screens presented to the user are shown in FIGS. 10–11. The product listing screen shows basic statistics that are a combination of all of the statistics from each game in a bio file. In one embodiment, a bio file corresponds to information in shared game state file 402. The information displayed on this screen includes sports level, number of sports titles played, the total sports game time, and a listing of each product in the bio file.

The sports level might be a number calculated based on the number of sports titles played and the sports game time. As shown in FIG. 9, the logic for interfacing with the shared game data file can be separate from the main game logic, to allow for different development paths. This separate logic might include the actual formula for calculating the level. An example formula is that each game can add five levels to the overall level and playing a game for some number of hours (such as five hours) increases the level that that game awards. Thus, a user can play a game for 25 hours of total game time to get to a level five for that game. To get beyond five levels, the user would have to play another game and gain experience there. In some variations, the total game time determines the level, but it is limited based on the games. In that variation, a user who played 50 hours on one game would be at a level 5 until playing another game (and saving it to his or her bio file), at which point the user would get to level 10. Preferably, even if a game is removed from the bio file to make room for newer games, the levels achieved through the removed games are not lost. Even if the number of games storable in a bio is limited, a count of the total games ever played and stored and the total sum of all the hours played might be tracked in the bio file. If that is the case, then the total play time might not be a sum of the play time for all of the games currently listed in the bio file.

The basic information stored for a game might include the product listing as well as the "box art" of the game. When the user highlights one of the game titles in a display, the box art would show, as illustrated in FIG. 10 by box art image 1050. This box art is copied to the shared bio file from the game media for the game represented by the box art, so that other games can display the logo for it without those games needing to be loaded. In one embodiment, box art image 1050 is an 8-bit image with resolution of 128 by 128 pixels. To save some space, some of the box art might be deleted from the bio file or not loaded, but the statistics saved. For example, where up to 50 game entries are stored in a bio file, the box art might be limited to the most recent 25 games. In some instances, no box art is stored. Where an image is to be displayed for a game having an entry but no box art, a generic image might be displayed, such as an "EA Sports" logo.

As shown in FIG. 10, a bio listing on one game might indicate (e.g., star icon 1060 of the right side of the title listings) that awards are pending in another game, thus prompting the user to go back and play a game not recently played.

FIG. 11 illustrates a product summary screen according to one embodiment of the present invention. This summary information can be open-ended so there would be no need for title specific features or data. Interesting statistics tracked for each product might be chosen because they work across multiple sports, such as those shown in Table 7.

TABLE 7

| Item | Description |
| --- | --- |
| Hours Logged | This is the total of the time spent within this specific title. It is up to each title to determine what time gets counted. |
| Last Date Played | This was the last date the user played the selected title. |
| Rewards Unlocked | This lists the number of awards that have been unlocked as well as the number of new rewards that are waiting. |
| Next Reward | This lists the level the player needs to get to unlock the next reward. |

Accomplishments

Accomplishments can be anything each product desires. Each product can implement its own set of accomplishments and the hooks that trigger them. As the user completes an accomplishment, he or she might receive a message stating the accomplishment that was achieved, with the ability to update (save) the user's bio file.

In some embodiments, accomplishments are divided into major accomplishments and recent accomplishments, where major accomplishments are the last N (where N=5 or another number) highest ranking accomplishments. These accomplishments should be sorted by accomplishment value in descending order. Recent accomplishments are the M (M=27 or some other number) most recent accomplishments. These should be sorted by accomplishment date from the most recent.

Examples of accomplishments for Title A include those shown in Table 8.

TABLE 8

| Accomplishment Hook | Value | Text String |
| --- | --- | --- |
| Franchise - 30 years | 255 | Completed 30-year coaching career |
| Franchise - Four Champs | 200 | Won four consecutive Super Bowls |
| Franchise - World Champs | 125 | Won the Super Bowl |

Examples of accomplishments for Title B include those shown in Table 9.

TABLE 9

| Accomplishment Hook | Value | Text String |
| --- | --- | --- |
| Dynasty - 60 years | 255 | Completed 60-year coaching career |
| Dynasty - Four Champs | 200 | Won four consecutive National Championships |
| Dynasty - Three Champs | 175 | Won three consecutive National Championships |
| Dynasty - Two Champs | 150 | Won back to back National Championships |
| Dynasty - National Champs | 125 | Won the National Championship |
| Dynasty - Coach | 110 | Won Coach of the Year |
| Dynasty - Heisman | 100 | Won the Heisman Memorial Trophy |
| Dynasty - Recruiting | 90 | Landed the #1 recruiting class in the nation |
| Dynasty - Conference | 75 | Won Conference Championship |
| Dynasty - Bowl Win | 60 | Won a bowl game |
| Dynasty - Bowl Bid | 40 | Earned a bid to play in a bowl game |
| Any - Defeated #1 | 25 | Defeated #1 team in the nation |
| Any - Defeated Rival | 5 | Defeated school rival |
| Any - Team Pts Scored | 10 | Broke the single-game record for most points scored by a team |
| Any - Team Total Offense | 10 | Broke the single-game team record for most total offensive yards |
| Any - Team Pass Yards | 10 | Broke the single-game team record for most passing yards |
| Any - Team Rush Yards | 10 | Broke the single-game team record for most rushing yards |

TABLE 9-continued

| Accomplishment Hook | Value | Text String |
|---|---|---|
| Any - Team Sacks | 10 | Broke the single-game team record for most sacks |
| Any - Team Interceptions | 10 | Broke the single-game team record for most interceptions |

Saving and Loading

As the title is loading, initialization code of the title should search all storage media currently hooked up to game device 14 and load the most recently saved bio file. If the bio file has a fixed name, a user will only have one bio file present on his or her storage media. Preferably, if no file is found, one is not created automatically. Instead, the bio file should be first created after the user has completed an accomplishment or manually accesses a "bio" menu option, so that bio files are not created when not intended by the user.

As a user completes an accomplishment, the game should prompt the user and allow for a game save, which would update the bio file as well. If the title has an auto-save feature, the auto-save might be triggered after each accomplishment or after each game played. If game code had loaded a bio file and tries to update the same file after completing an accomplishment, the code should verify that the file is still present on the storage device. If the file is there, the user is prompted to overwrite the file using the interface's normal overwrite message. If the file is not found, the user should be prompted to re-insert the memory card containing the bio file. Also, a checksum may be used to correctly identify a user's bio file of when the memory card is removed.

Game Rewards

Each title would be able to set up its own rewards and assign levels to each reward based on the value of the reward. As a game first writes to the bio file, it should store an array that contains each reward along with the level needed to unlock that reward. The title should be responsible for detecting that a reward has been earned and actually presenting that reward although it is recommended that a check be made at boot so that rewards are given immediately.

Examples of rewards include those shown in Table 10.

TABLE 10

| Reward Hook | bio | Level |
|---|---|---|
| Unlock the EA SPORTS team | 0 | 2 |
| Sugar Buzz Team | 1 | 4 |

Accordingly, embodiments of the present inventions provide a shared game state file that is read and written to by multiple game applications for games. Data in the shared game state file is then used by multiple games to affect actions in each game. For example, a first game may use data in a second game to affect actions in the first game.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for enabling interaction with a shared game data file using a game device, the method comprising:
   providing logic to perform one or more actions associated with the shared game data file;
   providing logic to cause the game device to perform an action in the one or more actions with the shared game data file as part of operating a game of a plurality of games, the shared game data configured to store at least first game data associated with accomplishments attained in a first game of the plurality of games and second game data associated with accomplishments attained in a second game of the plurality of games, the shared game data being such that at least one accomplishment attainable in the first game is distinct from accomplishments attainable in the second game; and
   providing logic in the second game to use the first game data to provide a user game opportunities in the second game not available to the user based on accomplishments attained in the second game alone, wherein at least one game opportunity made available in the second game is the result of an accomplishment in the first game distinct from accomplishments possible in the second game, wherein the logic to perform one or more actions is included on a game medium.

2. The method of claim 1, wherein the game medium comprises a CDROM, DVD, or a cartridge.

3. The method of claim 1, wherein the shared game data file comprises game state data for the first game.

4. The method of claim 1, wherein the action comprises using data stored in the shared game data file relating to a prior performance by a player of the first game to provide a program flow path in the second game.

5. The method of claim 4, wherein the program flow path comprises providing a player access to a level of the second game according to the prior performance.

6. The method of claim 1, wherein the one or more actions are asynchronous actions.

7. The method of claim 1, wherein the one or more actions comprise read and write actions to read and write data to the shared game data file.

8. The method of claim 1, wherein accomplishments attained include playing the first game for more than a threshold amount of time that, when attained, provide the user game opportunities in the second game not available to the user based on accomplishments attained in the second game alone.

9. The method of claim 1, wherein the first game is a first sporting game and the second game is a second sporting game distinct from the first sporting game.

10. The method of claim 1, wherein the first game is a first title and the second game is a second title distinct from the first title.

11. The method of claim 1, wherein the game opportunities include advancing levels, bonuses, passwords, additional capabilities, additional challenges, or provides a desired effect on game play in the second game.

12. The method of claim 11, wherein resources include equipment, strength, or points.

13. In a gaming system wherein self-contained games are operated to allow user interaction when corresponding game media are electronically in communication with the gaming system, a method of providing persistent shared game data comprising:

storing data in the gaming system external to game storage for a first game, as shared game data, such that the shared game data persists after the first game is no longer being played, the shared game data including at least first game data associated with accomplishments attained in the first game of a plurality of games and second game data associated with accomplishments attained in a second game of the plurality of games, the shared game data being such that at least one accomplishment attainable in the first game is distinct from accomplishments attainable in the second game; and when operating a second game, using the first game data to provide a user game opportunities in the second game not available to the user based on accomplishments attained in the second game alone, wherein at least one game opportunity made available in the second game is the result of an accomplishment in the first game distinct from accomplishments possible in the second game.

14. The method of claim 13, further comprising modifying the shared game data during operation of the second game or a third game other than the first game.

15. The method of claim 13, wherein game media are CDROMs or DVDs and the game media are electronically in communication with the gaming system in that a CDROM or DVD is positioned in a CDROM or DVD reader of the gaming system.

16. The method of claim 13, wherein the accomplishments relate to performances of a player of the first or second game that stores the shared game data.

17. The method of claim 16, wherein the performances relate to game outcomes in sports games and the shared game data reflects accomplishments in sports games.

18. The method of claim 17, wherein the accomplishments include elapsed game play time, nongame play time, scores of completed sports contests or levels of competitive recognition achieved.

19. In a gaming system wherein self-contained games are operated to allow user interaction when corresponding game media are electronically in communication with the gaming system, a method of providing different game experiences to players with different achievements over a plurality of games, the method comprising:

when executing a first game, storing indications of player achievements for the first game in a shared game dataset;

when executing a second game, storing indications of player achievements for the second game in the shared game dataset, the shared game dataset being such that at least one player achievement attainable in the first game is distinct from a player achievement attainable in the second game;

when executing the first game, reading at least a portion of the shared game state dataset into a memory accessible to a processor executing the first game, the at least a portion including at least one achievement of the second game other than the first game, the at least one achievement providing a user game opportunities in the first game not available to the user based on the at least one achievement attained in the second game alone, wherein at least one game opportunity made available in the second game is the result of an achievement in the first game distinct from achievements possible in the second game; and when executing the first game, deciding on a program flow path among a plurality of program flow paths based on the at least a portion of the shared game dataset.

20. The method of claim 19, wherein deciding on a program flow path is deciding on which of a plurality of game levels to begin a game, the game level being a more advanced level for a player with more achievements than a player beginning and a less advanced level.

21. The method of claim 19, further comprising providing a player having sufficient achievements as reflected in the shared game dataset with capabilities as user game opportunities not provided to a player not having sufficient achievements as reflected in the shared game dataset.

22. The method of claim 19, further comprising providing a player having sufficient achievements as reflected in the shared game dataset with challenges as game opportunities not provided to a player not having sufficient achievements as reflected in the shared game dataset.

23. The method of claim 19, further comprising providing a player having sufficient achievements as reflected in the shared game dataset with awards or bonuses as game opportunities not provided to a player not having sufficient achievements as reflected in the shared game dataset.

24. An apparatus for executing self-contained games, wherein a player plays one game at a time by executing game code and completes noted tasks in games as they are played, the apparatus comprising:

storage for game state for a plurality of games, wherein game data storage is associated and specific to a game;

storage for shared game data for the plurality of games, wherein at least each of the games in the plurality of games can read and write shared game data to reflect noted accomplishments completed in a current game is being played;

game logic of a first game to read the shared game data, including at least a portion of the shared game data created by a prior execution of a second game other than the first game, the shared game data including at least first game data associated with accomplishments attained in the first game and second game data associated with accomplishments attained in a second game, the shared game data being such that at least one accomplishment attainable in the first game is distinct from accomplishments attainable in the second game; and providing logic in the second game to use the first game data to provide a user game opportunities in the second game not available to the user based on accomplishments attained in the second game alone, wherein at least one game opportunity made available in the second game is the result of an accomplishment in the first game distinct from accomplishments possible in the second game.

25. The apparatus of claim 24, wherein the game logic to read the shared game data includes an application programming interface to functions for reading and writing a storage device specific to the apparatus and usable with the plurality of games and games other than the plurality of games.

26. The apparatus of claim 24, further comprising:
shared game data management logic for managing shared game data;
callback initiation logic providing hooks to the shared game data management logic for performing lower level functions implemented in the game code and not implemented in the shared game data management logic.

27. A computer readable medium including instructions for enabling interaction with a shared game data file using a game device, the computer readable medium comprising:
instructions configured to perform one or more actions associated with the shared game data file;
instructions configured to cause the game device to perform an action in the one or more actions with the shared game data file as part of operating a game of a plurality of games, the shared game data configured to store at least first game data associated with accomplishments attained in a first game of the plurality of games and second game data associated with accomplishments attained in a second game of the plurality of games, the shared game data being such that at least one accomplishment attainable in the first game is distinct from accomplishments attainable in the second game; and
instructions in the second game configured to use the first game data to provide a user game opportunities in the second game not available to the user based on accomplishments attained in the second game alone, wherein at least one game opportunity made available in the second game is the result of an accomplishment in the first game distinct from accomplishments possible in the second game.

28. The computer readable medium of claim 27, wherein the logic to perform one or more actions is included on a game medium.

29. The computer readable medium of claim 28, wherein the game medium comprises a CDROM, DVD, or a cartridge.

30. The computer readable medium of claim 27, wherein the shared game data file comprises game state data for the first game.

31. The computer readable medium of claim 27, wherein the action comprises using data stored in the shared game data file relating to a prior performance by a player of the first game to provide a program flow path in the second game.

32. The computer readable medium of claim 31, wherein the program flow path comprises providing a player access to a level of the second game according to the prior performance.

33. The computer readable medium of claim 27, wherein the one or more actions are asynchronous actions.

34. The computer readable medium of claim 27, wherein the one or more actions comprise read and write actions to read and write data to the shared game data file.

35. The computer readable medium of claim 27, wherein accomplishments attained include playing the first game for more than a threshold amount of time that, when attained, provide a user game opportunities in the second game not available to the user based on accomplishments attained in the second game alone.

36. The computer readable medium of claim 27, wherein the first game is a first sport and the second game is a second sport distinct from the first sport.

37. The computer readable medium of claim 27, wherein the first game is a first title and the second game is a second title distinct from the first title.

38. The computer readable medium of claim 27, wherein the game opportunities include advancing levels, bonuses, passwords, additional capabilities, additional challenges, or provides a desired effect on game play in the second game.

39. The computer readable medium of claim 38, wherein resources include equipment, strength, or points.

* * * * *